Patented Jan. 9, 1934

1,942,909

UNITED STATES PATENT OFFICE 1,942,909

FREEWHEEL MECHANISM

Hubert Freiherr von Thüngen, Friedrichshafen, Bodensee, Germany, assignor to Zahnradfabrik Friedrichshafen Aktiengesellschaft, of Friedrichshafen, Bodensee, Germany Application June 8, 1932, Serial No. 616,077, and in Germany July 15, 1931

1 Claim. (Cl. 192—45)

My invention relates to free wheel mechanism. The object of my invention is to combine a roller bearing with a free wheel mechanism so that the rollers used serve as well for the bearing as for the free wheel mechanism.

There are other advantages connected with my invention which will be obvious when having reference to the drawing which represents two examples embodying my invention.

Figure 1:
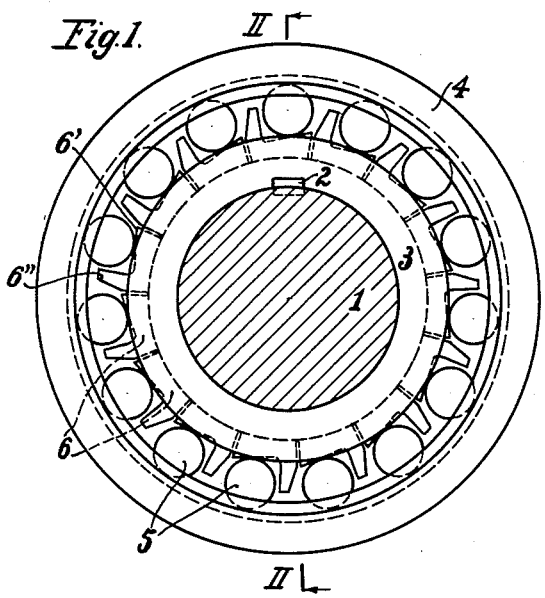
Fig. 1 is a side view of a combined bearing and free wheel mechanism and Fig. 2 is a vertical section taken on line II—II of Fig. 1, but shaft 1 being not cut.

Keyed to shaft 1 by means of key 2 is inner ring 3. Between this ring 3 and the hollow shaft 4 rollers 5 are situated thus forming a roller bearing.

Figure 2:
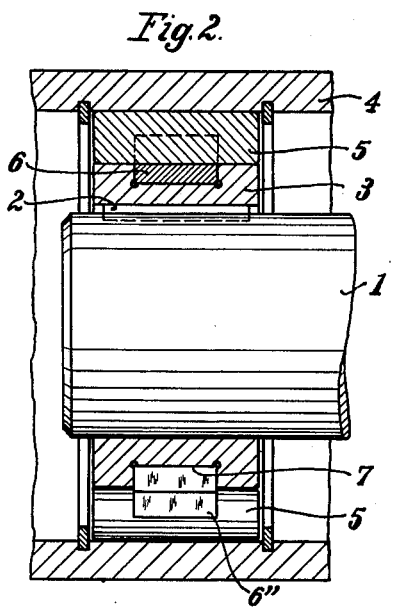
Figure 3:
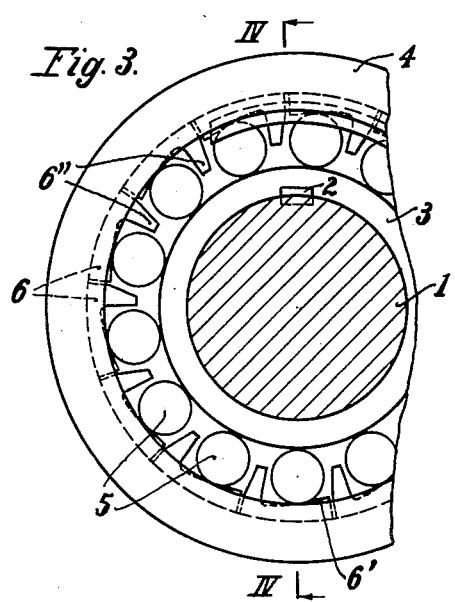
Figs. 3 and 4 represent another modification, Fig. 3 being again a side view and Fig. 4 a corresponding vertical section taken on line IV—IV of Fig. 3, shaft 1 again being not cut.
Figure 4:
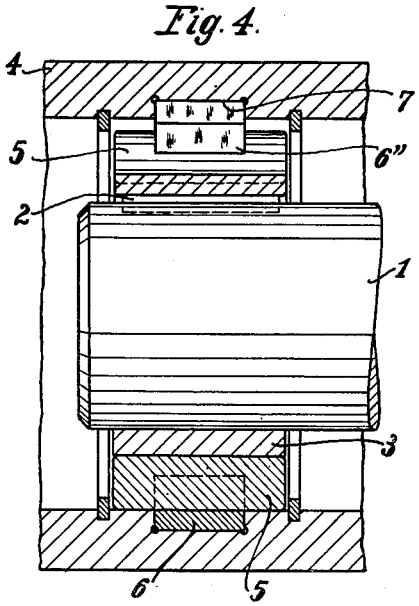

In the example represented in Figs. 1 and 2 a circular groove 7 is provided on the inner ring 3, whereas in the example given in Figs. 3 and 4 such groove is provided on the outer hollow shaft 4. Instead of making the groove 7 directly in the shaft 4 an additional outer ring keyed to shaft 4 may be provided.

Elements 6 fitting into this groove 7 are so shaped that they have a wedge-shaped surface 6′ facing the rollers 5 and a projection 6″ projecting into the space between two adjacent rollers. The wedge-shaped surface 6′ of each element 6 partly projects from the corresponding circular surface of the ring in which the elements 6 are situated, whereas its other portion is lower than the ring side surfaces against which the rollers 5 bear.

Because of these elements 6 the entire mechanism becomes a free wheel mechanism, as will be understood without further explanation. In one relative direction of rotation of shafts 1 and 4 there will be free wheeling, the elements 6 being pushed along by the rollers 5 by means of the projections 6″. In the other relative direction of rotation the rollers 5 are jammed between the wedge surfaces 6′ of the elements 6 and the opposite ring surface, respectively, and cause both shafts to rotate with one another.

According to my invention I provide as many elements 6 as there are rollers 5. Therefore it is not necessary to make an exact division as with the ordinary free wheel mechanism. The elements 6 can easily be manufactured in series from a rod or the like to which the cross sectional shape is given on usual tool machines and can be ground by means of adequately profiled discs. Thus allowing for cheap manufacture.

Furthermore with the design and construction according to my invention it is not necessary to provide expensive cages for rollers or balls as with other free wheel mechanism. Besides the rings and the groove therein can also be ground.

If necessary the elements 6 can easily be exchanged for new ones, individually.

I do not want to be limited to the details described or shown in the drawing as many variations will occur to those skilled in the art.

What I claim is:

A free wheel mechanism comprising; two circular members, one within the other; a plurality of rollers fitting into the space between said members; and a plurality of elements, one for each roller, fitting into a groove provided on one of said circular members, said elements each having a wedge-shaped surface facing the roller it belongs to and a projection projecting into the space between its roller and the adjacent roller, said projection having its root at the lower-most portion of said wedge-shaped surface.

HUBERT FRH. v. THÜNGEN.